April 22, 1958 E. W. ALLEN 2,831,998

MULTICOLOR CATHODE RAY TUBE AND VIEWING SCREEN AND POST DEFLECTION FOCUSING UNIT THEREFOR

Filed Jan. 3, 1955 2 Sheets-Sheet 1

INVENTOR.
Eugene Wallace Allen
BY George E. Frost
Attorney

INVENTOR.
Eugene Wallace Allen
BY George E. Frost
Attorney

United States Patent Office 2,831,998

Patented Apr. 22, 1958

2,831,998

MULTICOLOR CATHODE RAY TUBE AND VIEWING SCREEN AND POST DEFLECTION FOCUSING UNIT THEREFOR

Eugene W. Allen, Skokie, Ill.

Application January 3, 1955, Serial No. 479,299

16 Claims. (Cl. 313—77)

My invention relates to an improved multicolor cathode ray tube especially suitable for reproducing television images in full color and to a viewing screen and post deflection focusing unit therefor.

In the transmission of black and white television images the cathode ray beam of the receiving cathode ray tube is caused to write across the viewing screen in unison with the like writing of the ray beam of the cathode ray pickup tube at the transmitter. The writing proceeds in a series of closely spaced nearly horizontal lines across the viewing screen while the intensity of the ray beam of the receiving cathode ray tube is modulated in accordance with the modulations created on the cathode ray beam of the pickup tube at the transmitter, thus reproducing on the viewing screen of the receiving tube the image on the pickup tube at the transmitter. In color television transmission the colors of the original image at the television transmitter are broken down into their respective components, generally red, green and blue. These are then transmitted in one of four basic ways, namely: in successive red, green and blue full image fields; in successive red, green and blue scanning lines; in successive red, green and blue image dots or elemental areas, or red, green and blue simultaneous complete image fields. To reproduce the transmitted image in full color it is necessary to reconstitute on a single viewing area the sequential fields, lines or image dots in their respective colors or the three simultaneous color images while modulating the cathode ray beam or beams in accordance with the respective color contents of the fields, lines, or image dots as the case may be.

In the apparatus described herein a color image is reconstituted on the face of a viewing screen by the use of a plurality of lines of phosphors capable of producing the respective transmitted color components of the image. These lines are arranged in groups having a predetermined sequential order as the screen is traversed. Thus, for example, they may be red, green, blue; red, green, blue; red, green, blue; etc. The respective phosphor lines may, for example, be of the order of 10 to 20 thousandths of an inch in width, so that from a reasonable viewing distance the colored light produced coalesces into a continuous colored image in the same fashion as do the colored dots of a colored half-tone picture reproduction.

The cathode ray beam is caused to impinge upon a selected color line by the action of color focusing elements located parallel to and in closely spaced relation to the phosphor lines. These elements are symmetrically disposed with respect to the junctions of the respective groups of color producing phosphors and are relatively closely spaced in relation to the span of each group of colored lines. Thus each pair of these focusing elements may be spaced by about thirty thousandths of an inch. Preferably these focusing elements are formed by conducting deposits on the opposite faces of thin comparatively flat glass bars and contact is made with the respective conducting faces by comb-like collectors having prongs which extend between the bars and bear against their respective flat conducting sides as hereinafter described in detail.

In operation, the apparatus of the present invention is caused to create the desired colored light by applying color switching voltages to the plates of each pair of color focusing elements. When this voltage is zero the ray beam is focused on the center line of each group of color producing lines of phosphors. This may, for example, be green. Post deflection focusing action is provided at this time by biasing all of the focusing elements negative in relation to the viewing screen, so that the elements serve to concentrate the ray beam at the center (green) line. When it is desired to produce another color—say blue—the deflecting elements are charged in relation to each other, in addition to the bias between them and the viewing screen, so that the ray beam is both focused and deflected as required to energize the blue lines. For the third color—say red—the deflecting elements are again charged in relation to each other, but with charges opposite to those used to produce blue, to deflect and concentrate the beam on the red light producing lines.

The apparatus of the present invention is suitable for use with any of the basic color transmitting systems. If, for example, a field sequential system is used the color deflecting elements are energized with a rectangular wave voltage at the field frequency, such as 60 cycles per second. If a line sequential system is used, the color deflection elements are energized with a square wave voltage of line frequency, for example, 15,000 cycles per second. On the other hand, if a dot or image element sequential system is used the elements are energized with a voltage corresponding to the band width of the video signal, for example 4 megacycles per second. In the case of a simultaneous color signal, the signal can be used with the tube of the present invention after processing.

It is therefore a general object of the present invention to provide an improved multicolor cathode ray tube and a viewing screen and post deflection focusing unit therefor.

Further, it is an object of the present invention to provide an improved multicolor cathode ray tube and a viewing screen and post deflection focusing unit therefor wherein the phosphors on the viewing screen are deposited in parallel lines in color groups having a predetermined repetitive sequence as the screen is traversed.

A more detailed object of the present invention is to provide an apparatus of the above type in which each component color is included in one and only one line per group and the adjacent lines of each color have like spacing.

Further it is an object of the present invention to provide an improved apparatus of the above type which is useful with field sequential, line sequential, dot sequential, or simultaneous color television transmission.

An additional detailed object of the present invention is to provide a post deflection focusing structure for a cathode ray tube in which elongated flat glass bars with conducting deposits on their opposed flat faces define the focusing and deflecting elements.

Still another object of the present invention is to provide a simple and easily manufactured structure by which electrical contact can be made with the electrode-defining flat faces of the non-conducting bars.

Other and additional objects of the present invention include the provision of a color reproducing cathode ray tube, and viewing screen and post deflection focusing unit therefor which is characterized by simplicity, comparative ease of construction, efficient production of colored light, reliability, applicability to the common methods of color television transmission, and other characteristics rendering it suitable for commercial application such as colored television and other like purposes.

The novel features which I believe to be characteristic of my invention are set forth with particularity in the appended claims. My invention itself, however, both as to its organization and method of operation, together with further objects and advantages thereof, will be best understood by reference to the following description taken in conjunction with the accompanying drawings in which:

Figures 1, 2, 3, 4, 4A:
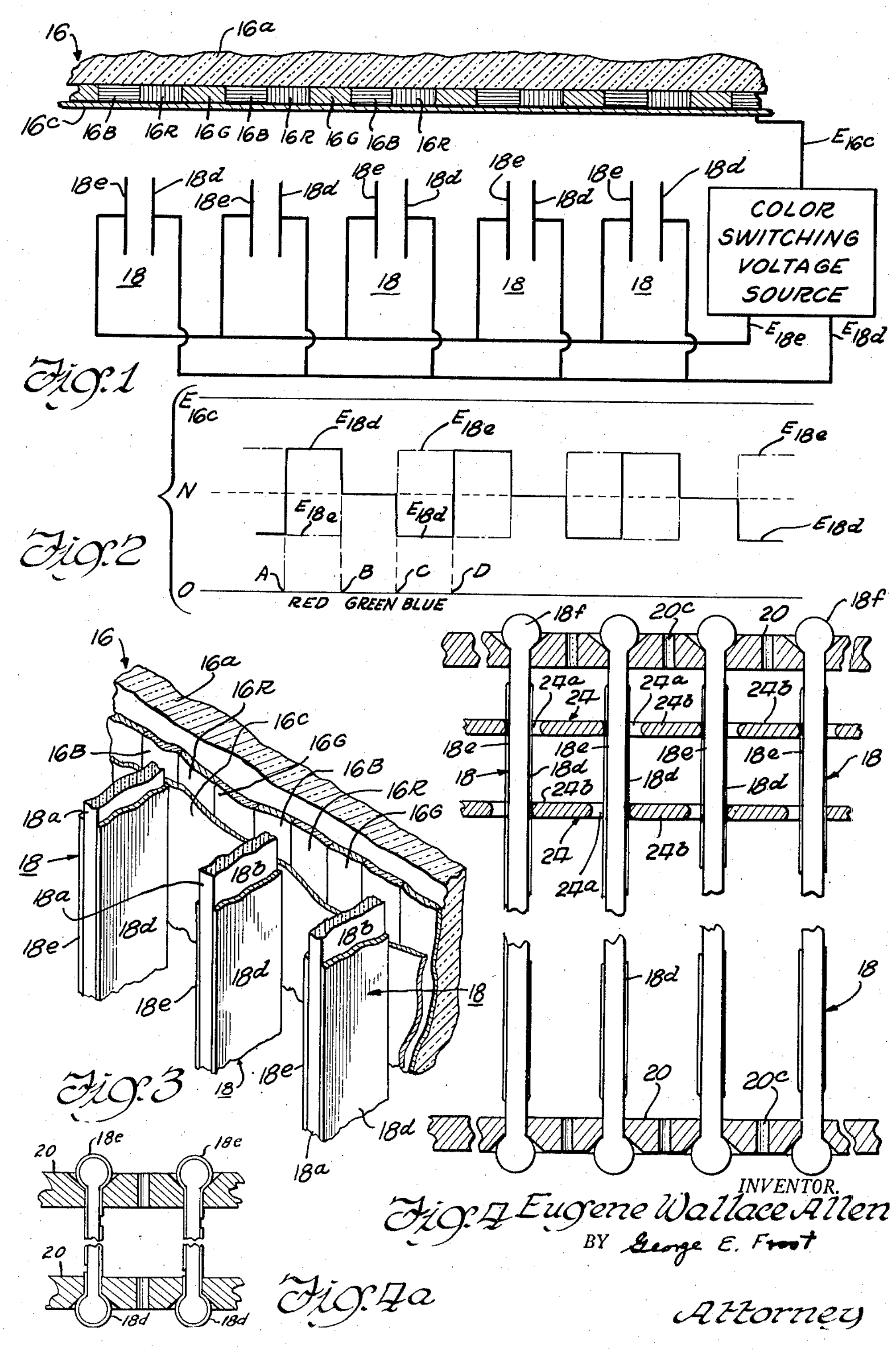
Figure 1 is a somewhat schematic greatly enlarged view of the viewing screen of a cathode ray tube and the post deflection focusing elements constructed in accordance with the present invention.
Figure 2 is a diagram showing the voltage wave applied to the deflecting elements.
Figure 3 is a greatly enlarged fragmentary view in perspective of the apparatus of Figure 1.
Figure 4 is a greatly enlarged view in vertical cross-section showing how the deflecting elements are supported in taut condition and electrical contact is made therewith.
Figures 5, 6, 9:
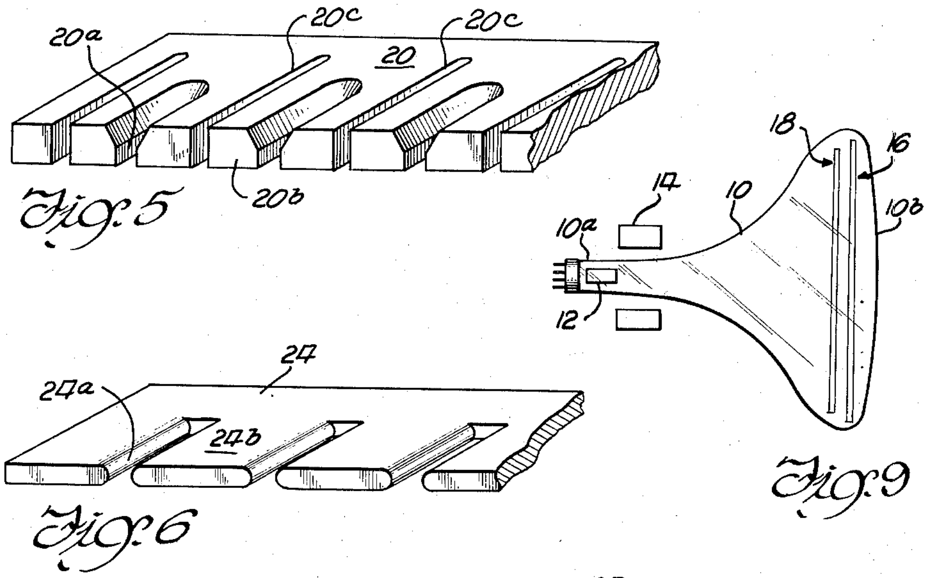
Figure 7A:
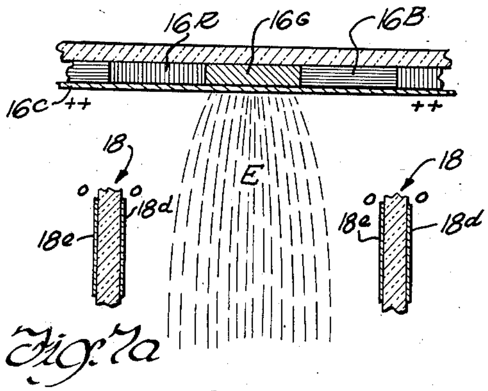
Figure 7B:
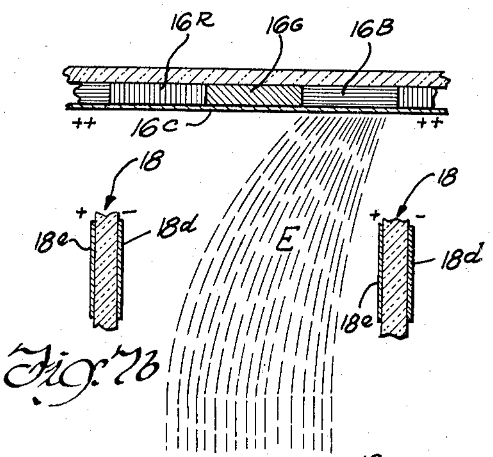
Figure 7C:
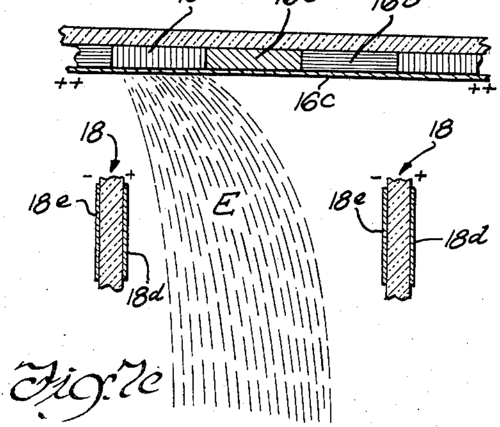
Figure 8:
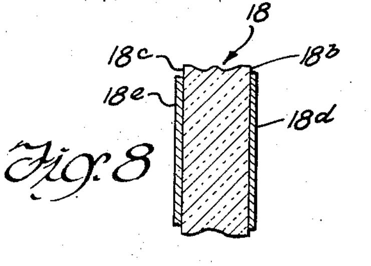

Figure 4*a* is a fragmentary view like Figure 4 but showing an alternative supporting and contact-making arrangement;

Figure 5 is an enlarged view in perspective showing the main support header of the construction of Figure 4;

Figure 6 is a greatly enlarged view in perspective showing a contact-making header of the type shown in Figure 4;

Figures 7*a*, 7*b* and 7*c* are enlarged fragmentary views similar to Figure 1 showing how the electron beam is deflected and focused by the mechanism of the present invention;

Figure 8 is a greatly enlarged view in cross-section of one of the deflecting elements; and, Figure 9 is a view showing a complete multicolor cathode ray tube constructed in accordance with the present invention.

Referring now to Figure 9, the tube of the present invention consists of a glass envelope 10 having a neck portion 10*a*, in which the electron gun 12 is mounted to produce a deflectable electron beam directed towards the face 10*b* of the tube. A pair of vertically oriented magnetic deflection coils 14 are provided to deflect the ray beam horizontally for horizontal ray beam deflection in accordance with usual television practice. A similar pair of deflection coils (not shown) produce a horizontal magnetic field through the neck 10*a* to deflect the ray beam vertically. Immediately behind the face 10*b* of the tube 10 there is provided a phosphor screen 16 upon which the multicolor image is produced as described in detail hereafter. The focusing and deflecting elements 18 are interposed between the phosphor screen 16 and the electron gun 12 as shown generally in Figure 9 and as described in detail hereafter.

The detailed construction of the phosphor screen 16 is seen best in Figures 1 and 3. As shown in these figures the screen consists of a transparent backing member 16*a* of glass or similar material. On the side facing electron gun 12, and over the phosphors described hereafter, the glass 16*a* has a thin conductive coating 16*c*. This may, for example, be an evaporated aluminum coating which is sufficiently thin to pass the electron stream while at the same time being a reasonably good electrical conductor. The phosphors are interposed between the face of the glass 16*a* and the conductive coating 16*c* as shown and are laid on the glass 16*a* prior to deposit of the coating 16*c*. These are in a series of fine lines indicated at 16B, 16R and 16G, respectively. It will be observed that the phosphor lines are in groups of three in which the sequence 16R, 16G, and 16B is repeated. The phosphor lines 16R are made of phosphors which produce a red color when excited by an impinging electron beam. The phosphor lines 16G produce green illumination when similarly excited and the phosphor lines 16B produce a blue illumination. The red, green and blue colors produced by the phosphor lines 16R, 16G and 16B, respectively, are additive primary colors so that combinations of these colors will produce the full gamut of colors in accordance with the primary color principle well known in the art.

The phosphor lines 16R, 16G and 16B are made sufficiently narrow to produce the illusion that no lines exist when the screen 16 is viewed from normal viewing distance. In a practical television cathode ray tube the width of these lines may, for example, be 0.010 of an inch so that each group of three colors would measure 0.030 of an inch.

The electron beam is focused on the respective phosphor strips 16R, 16G and 16B and deflected to strike these strips selectively by the focusing and deflecting elements indicated generally at 18, Figures 1 and 3. Each of these units consists of an elongated relatively flat insulating carrier 18*a*, Figure 3. These carriers extend parallel to the strips 16B, 16R and 16G and to the plane of the viewing screen 16. Their flat faces 18*b* and 18*c* (Figure 8) are located in planes normal to the face of the viewing screen 16. In addition, the respective insulating support members 18*a* are aligned with the junctions of the respective lines of blue and red phosphors 16B and 16R as shown. Electrodes are formed on the flat faces 18*b* and 18*c* of the supports 18*a* by painting or other suitable processes to form the electrodes indicated at 18*d* and 18*e*, respectively. These are the plates shown diagrammatically in Figure 1. Because of the orientation and placement of the supporting members 18*a*, these plates are symmetrically positioned with respect to the successive groups—16R, 16G and 16B—of phosphor lines.

Preferably, the insulating support members 18*a* are made of glass. This material is a good insulator and is comparatively easily formed to desired shapes. The members may be, for example, about six one thousandths of an inch thick and their width in the direction of their flat faces may be twenty one thousandths of an inch. In such sizes the glass bars are comparatively flexible so that they flex rather than break under such pressure as is applied by the upper and lower connecting bars or headers 24, Figure 4.

The action of the deflecting and focusing elements 18 will best be understood by reference to Figures 7*a*, 7*b* and 7*c*. When, for example, it is desired to energize the green phosphor line 16G, Figure 7*a*, and the electron beam is directed generally between the adjacent deflecting elements 18 as shown in that figure, all of the plates 18*d* and 18*e* are given a negative potential in relationship to the potential of the conducting layer 16*c*. The electron beam E accordingly converges due to the repulsive forces between the electron and the negatively charged plates 18*d* and 18*e*. This accomplishes the convergence or focusing action shown in Figure 7*a* which tends to cause the electron beam to concentrate on the green phosphor line 16G. It will be noted that in this instance the action of the deflecting elements 18 is principally a focusing rather than a deflecting action which is due to the negative charges on the plates 18*d* and 18*e* and the relatively positive charge on the conducting layer 16*c*.

When it is desired to reproduce the blue color, the deflecting plates 18*d*, Figure 7*b*, are given a negative potential and the plates 18*e* are given a positive poential in relation to plates 18*d*. This produces an electrical field between the plates which deflects the electron beam E towards the blue phosphor lines 16B as shown in Figure 7*b*. At the same time, however, the electron beam E is caused to converge by the focusing action achieved by the electrodes 18*d* and 18*e* which are at this time both relatively negative in relation to the greater positive potential on the conducting layer 16*c*.

If it is desired to produce the red line by exciting the red phosphor strip, the deflecting plates 18*e* are given a negative charge as shown in Figure 7*c* and the plates 18*d* are given a relatively positive charge. The conducting layer 16c is maintained at a positive potential in relation to both electrodes. In this case the electrical fields between the plates 18e and 18d which face each other deflect the electron beam E towards the left and the positive potential of the conducting layer 16c in relation to both plates 18d and 18e causes a convergence or focusing of the electron beam so that only the red phosphor lines are illuminated.

Figure 2 show the voltages applied to the respective electrodes 18d and 18e to cause the electron beam successively to energize the phosphor lines in sequence. During the time A—B—when the red phosphor lines 16R are selected—the voltage applied to plates 18d ($E_{18d}$) is comparatively positive as shown. At the same time the voltage applied to the plates 18e is comparatively negative. During the succeeding green display period, B—C, both of these voltages return to the neutral value N which gives the requisite focusing negative potential between both groups of plates and the relatively positive bias voltage $E_{16c}$ on the conducting coating 16c. This gives rise to the condition of Figure 7a to energize the green phosphor lines. During the period C—D, when the blue lines are being energized, the voltage at plates 18d is relatively negative as shown and the voltage at plates 18e is relatively positive. During the repetition of this scanning sequence, the square waves shown at $E_{18d}$ and $E_{18e}$ are created. It should be noted, however, that departures from these square wave forms may be tolerated in actual practice without significant adverse effect to the fidelity of color reproduction.

It will be observed that the number of phosphor lines of each color in each group on the viewing screen is the absolute minimum consistent with full color reproduction. In other words, it is unnecessary with the apparatus above described to provide two red lines, for example, in every group of successive color lines, nor is it necessary to provide two lines in any other color. Since serious technical problems are involved in laying down the rather thin lines required for effective color reproduction, this is an important feature of the present invention because the minimum number of lines is required.

In actual television practice the lines 16R, 16G and 16B may be oriented either vertically or horizontally. In general it is preferable to provide a vertical orientation for use with a horizontal line system. However, the unit may be used either with dot sequential, line sequential, field sequential or simultaneous colored television systems and may be operated with the phosphor lines either vertical or horizontal as desired.

In the apparatus above described it is necessary to provide some means to sustain the respective vertical support member 18 in proper position and, in addition, to provide a single electrical contact with all of the electrodes 18e of the respective members and all of the electrodes 18d of the respective members. Figures 4, 5 and 6 show one way to accomplish this result. As shown in Figure 4, each of the members 18 has a headed end 18f which is received in an elongated beveled slot 20a of the headers 20. As shown in Figure 5 these headers have a series of such slots 20a extending to one face 20b so that the respective support member 18 may be slidably fitted into the slots and there held in position. The headers 20 are of resilient material and are slotted at 20c to form spring fingers which individually tension the respective members 18 to hold them under uniform tension. Each header 20 is fixedly mounted within the tube. If the headers 20 are of conducting material, the coatings 18d and 18e are terminated short of the headers as shown in Figure 4.

As shown in Figure 4 contact is made with the electrodes 18e by the upper contact-making header 24. As shown in Figure 6 this header is a comparatively flat bar of conducitve material having a series of marginal elongated slots 24a defining prongs 24b. Each header thus has a comb-like configuration. As shown in Figure 4, each prong 24b fits between one pair of adjacent members 18 but the width of the slots 24a is sufficient to provide a spacing or gap on one side of each prong 24b and the adjacent member 18. Consequently, the member 24 may be pulled slightly to the right as shown in Figure 4 and fixed in position to make contact with each of the electrodes 18e on the respective supports 18.

Contact is made with the electrodes 18d in similar fashion by the lower contact-making header 24. This header is constructed like the upper header 24 but is pulled in the left hand direction and fixed in position so that each of the prongs 24b is in electrical contacting relationship with the electrode 18d of each member 18. It will thus be observed that the upper member 24 forms a collector electrode to which connections may conveniently be made for all of the electrodes 18e and that the lower header 24 does likewise with respect to the electrodes 18d.

In an alternative construction, the headers 20 may be used as contact-making devices as shown in Figure 4a. In this case, the headers are conducting and the coating 18e is carried about the upper headed end of each member or element 18, and the coating 18d is carried about the lower headed end as shown so that the headers form terminals for the respective coatings.

In a commercially manufactured tube, the glass backing member 16a of screen 16, Figure 9, is preferably made integral with the front face 10b of the tube 10. In this case the front face of the tube 10 is preferably made flat or cylindrical to facilitate construction and alignment of the elements 18.

While I have shown and described a specific embodiment of the present invention it will be understood that numerous modifications and alternative constructions may be made without departing from its true spirit and scope. I therefore intend by the appended claims to cover all such modifications and alternative constructions as fall within their true spirit and scope.

What I claim as new and desire to secure by Letters Patent of the United States is:

1. A post deflection focusing unit for a color reproducing cathode ray tube comprising in combination: a plurality of elongated comparatively thin flat insulating members having conducting coatings on their opposed flat faces, the members being disposed in parallel array with their flat faces facing each other; a header attached to the end of the respective members to pull the same taut; and a pair of pronged comb-like conducting members disposed parallel to and is spaced relation with the header and with their prongs extending between the respective members, one of said last members having its prongs bearing against one side of each of said first members and the other of said last members having its prongs bearing against the other side of each of said first members.

2. A post deflection focusing unit for a color reproducing cathode ray tube comprising in combination: a plurality of elongated comparatively thin flat insulating members having conducting coatings on at least one face, the members being disposed in parallel array with the conducting coatings facing in a single direction; a header attached to the ends of the respective members to pull the same taut; and a comb-like conducting member disposed parallel to and in spaced relation with the header and with the prongs extending between the respective members and bearing against said conducting coatings.

3. A post deflection focusing unit for a color reproducing cathode ray tube comprising in combination: a plurality of elongated comparatively thin flat glass bars having conducting coatings on their opposed flat faces to form pairs of cathode ray beam deflecting plates, the bars being disposed in parallel array with their flat faces facing each other; a header attached to the ends of the respective bars to pull the same taut; and a pair of pronged comb-like conducting members disposed parallel to and in spaced relation with the header and with their prongs extending between the respective bars, one of said conducting members having its prongs bearing against one side of each of said bars and the other of said conducting members having its prongs bearing against the other side of each of said bars.

4. A post deflection focusing unit for a color reproducing cathode ray tube comprising in combination: a plurality of elongated comparatively thin flexible glass bars having conducting coatings on their opposed flat faces to form pairs of cathode ray beam deflecting plates, the bars being disposed in parallel array with their flat faces facing each other; means drawing the bars taut; and a pair of pronged comb-like conducting members disposed with their prongs extending between the respective bars, one of said conducting members having its prongs bearing against one side of each of said bars and the other of said conducting members having its prongs bearing against the other side of each of said bars.

5. A multicolor cathode ray tube comprising in combination: a viewing screen; a phosphor deposit on one side of the viewing screen, the phosphor deposit being in the form of a plurality of parallel lines, the phosphors of the adjacent lines producing illumination of different colors, said lines forming groups comprising one of each of said different color producing lines in a predetermined sequential schedule as the screen is traversed, said schedule being uniform for all of said groups; an electron gun positioned to generate an electron beam impinging upon the phosphors and adapted to be scanned thereover; and a plurality of pairs of conducting color deflecting elements located in relatively closely spaced relation to the screen, the elements of each pair being symmetrically positioned in relation to the boundary of a group of phosphor lines for each repetition of the said schedule and being in relatively closely spaced relation with respect to each other and to the width of each of said groups of phosphor lines.

6. A multicolor cathode ray tube comprising in combination: a viewing screen; a phosphor deposit on one side of the viewing screen, the phosphor deposit being in the form of a plurality of parallel lines, the phosphors of the adjacent lines producing illumination of different colors, said lines forming groups comprising one of each of said different color producing lines in a predetermined sequential schedule as the screen is traversed, said schedule being uniform for all of said groups; an electron gun positioned to generate an electron beam impinging upon the phophors and adapted to be scanned thereover; and a plurality of pairs of conducting color deflecting plates normal to the screen and located in relatively closely spaced relation to the screen, the plates of each pair being comparatively long in relation to their spacing and symmetrically positioned in relation to the boundary of a group of phosphor lines for each repetition of the said schedule and being in relatively closely spaced relation with respect to each other and to the width of each of said groups of phosphor lines.

7. A multicolor cathode ray tube comprising in combination: a viewing screen; a phosphor deposit on one side of the viewing screen, the phosphor deposit being in the form of a plurality of parallel lines, the phosphors of the adjacent lines producing illumination of three different primary colors, said lines forming groups comprising one of each of said primary color producing lines arranged in a predetermined repetitive sequence as the screen is traversed, said sequence being uniform for all of said groups; an electron gun positioned to generate an electron beam impinging upon the phosphors and adapted to be scanned thereover; and a plurality of pairs of conducting color deflecting elements located in relatively closely spaced relation to the screen, the elements of each pair being symmetrically positioned in relation to the boundary of the groups of phosphor lines for each repetition of the said sequence and being in relatively closely spaced relation with respect to each other and to the width of each of said groups of phosphor lines.

8. A multicolor cathode ray tube comprising in combination: a viewing screen; a phosphor deposit on one side of the viewing screen, the phosphor deposit being in the form of a plurality of parallel lines, the phosphors of the adjacent lines producing illumination of three different primary colors, said lines forming groups comprising one of each of said primary color producing lines arranged in a predetermined repetitive sequence as the screen is traversed, said sequence being uniform for all of said groups; an electron gun positioned to generate an electron beam impinging upon the phosphors and adapted to be scanned thereover; and a plurality of pairs of conducting color deflecting plates normal to the screen and located in relatively closely spaced relation to the screen, the plates of each pair being comparatively long in relation to their spacing and symmetrically positioned in relation to the boundary of the groups of phosphorus lines for each repetition of the said sequence and being in relatively closely spaced relation with respect to each other and to the width of each of said groups of phosphor lines.

9. A viewing screen and post deflection focusing unit for a color reproducing cathode ray tube comprising in combination: a backing member; a plurality of phosphors adapted to produce colored light on said backing member, the phosphors being in parallel closely spaced lines in which the adjacent lines produce light of different colors, said lines forming groups comprising one of each of said different color producing lines in a predetermined repetitive sequence as the screen is traversed, said sequence being uniform for all of said groups; means defining a conducting surface adjacent the phosphors; and a plurality of pairs of color deflecting elements located in relatively closely spaced relation to the backing member, the elements of each pair being symmetrically positioned in relation to the boundary of the groups of phosphor lines for each repetition of said sequence and being in relatively closely spaced relation with respect to each other and to the width of each of said groups of phosphor lines.

10. A viewing screen and post deflection focusing unit for a color reproducing cathode ray tube comprising in combination: a backing member; a plurality of phosphors adapted to produce colored light on said backing member, the phosphors being parallel closely spaced lines in which the adjacent lines produce light of different colors, said lines forming groups comprising one of each of said different color producing lines in a predetermined repetitive sequence as the screen is traversed, said sequence being uniform for all of said groups; means defining a conducting surface adjacent the phosphors; and a plurality of pairs of color deflecting plates normal to the backing member and located in relatively closely spaced relation to the backing member, the plates of each pair being comparatively long in relation to their spacing and symmetrically positioned in relation to the boundary of the groups of phosphor lines for each repetition of said sequence and being in relatively closely spaced relation with respect to each other and to the width of each of said groups of phosphor lines.

11. A viewing screen and post deflection focusing unit for a color reproducing cathode ray tube comprising in combination: a backing member; a plurality of phosphors adapted to produce illumination of three different primary colors on said backing member, the phosphors being in parallel closely spaced lines in which the adjacent lines produce light of the three primary colors, said lines forming groups comprising one of each of said primary color producing lines in a predetermined repetitive sequence as the screen is traversed, said sequence being uniform for all of said groups; means defining a conducting surface adjacent the phosphors; and a plurality of pairs of color deflecting elements located in relatively closely spaced relation to the backing member, the elements of each pair being symmetrically positioned in relation to the boundary of the groups of phosphor lines for each repetition of the said sequence and being in relatively closely spaced relation with respect to each other and to the width of each of said groups of phosphor lines.

12. A viewing screen and post deflection focusing unit for a color reproducing cathode ray tube comprising in combination: a backing member; a plurality of phosphors adapted to produce illumination of three different primary colors on said backing member, the phophors being in parallel closely spaced lines in which the adjacent lines produce light of the three primary colors, said lines forming groups comprising one of each of said primary color producing lines in a predetermined repetitive sequence as the screen is traversed, said sequence being uniform for all of said groups; means defining a conducting surface adjacent the phosphors; and a plurality of pairs of color deflecting plates normal to the backing member and located in relatively closely spaced relation to the backing member, the plates of each pair being comparatively long in relation to their spacing and symmetrically positioned in relation to the boundary of the groups of phosphor lines for each repetition of the said sequence and being in relatively closely spaced relation with respect to each other and to the width of each of said groups of phosphor lines.

13. A viewing screen and post deflection focusing unit for a color reproducing cathode ray tube comprising in combination: a backing member; a plurality of phosphors adapted to produce colored light on said backing member, the phosphors being parallel closely spaced lines in which the adjacent lines produce light of different colors in accord with a repetitive sequence of colors as the phosphors are traversed; means defining a conducting surface adjacent the phosphors; a plurality of comparatively flat nonconducting bars located comparatively close to the backing member with their lengthy dimension parallel to the lines defined by the phosphors, with their flat faces normal to the backing member, and aligned with the boundaries of the groups of phosphor lines for each repetition of the said sequence, the thickness of the bars between their flat faces being comparatively small in relation to the width of the phosphor lines; and conducting material deposited on the flat faces of the bars to form post deflection focusing plates for a cathode ray beam traversing the viewing screen.

14. A viewing screen and post deflection focusing unit for a color reproducing cathode ray tube comprising in combination: a backing member; a plurality of phosphors adapted to produce colored light on said backing member, the phosphors being in parallel closely spaced lines in which the adjacent lines produce light of different colors in accord with a repetitive sequence of colors as the phosphors are traversed; means defining a conducting surface adjacent the phosphors; a plurality of comparatively flat glass bars located comparatively close to the backing member with their lengthy dimension parallel to the lines defined by the phosphors, with their flat faces normal to the backing member, and aligned with the boundaries of the groups of phosphor lines for each repetition of the said sequence, the thickness of the bars between their flat faces being comparatively small in relation to the width of the phosphor lines; and conducting material deposited on the flat faces of the glass bars to form post deflection focusing plates for a cathode ray beam traversing the viewing screen.

15. A post deflection focusing unit for a color reproducing cathode ray tube comprising in combination: a plurality of elongated comparatively thin flat insulating members having conducting coatings on their opposed flat faces, the members being disposed in parallel array with their flat faces facing each other; conducting resilient headers attached to the ends of said members to pull the same taut, the headers having slots straddling the points of attachment of the members to increase their effective resiliency and the coatings on the members terminating short of the respective headers.

16. A post deflection focusing unit for a color reproducing cathode ray tube comprising in combination: a plurality of elongated comparatively thin flat insulating members having conducting coatings on their opposed flat faces, the members being disposed in parallel array with their flat faces facing each other; conducting headers attached to the ends of the members to pull the same taut, the coating on one side of each member extending to contact-making position with one header and the coating on the other side of each member extending to contact making position with the other header whereby the headers form terminals for the respective conducting coatings of the members.

References Cited in the file of this patent

UNITED STATES PATENTS

| | | |
|---|---|---|
| 2,446,791 | Schroeder | Aug. 10, 1948 |
| 2,568,448 | Hansen | Sept. 18, 1951 |
| 2,577,368 | Schultz et al. | Dec. 4, 1951 |
| 2,660,684 | Parker | Nov. 24, 1953 |
| 2,692,532 | Lawrence | Oct. 26, 1954 |
| 2,723,361 | Beckers | Nov. 8, 1955 |